United States Patent [19]

Balkus, Jr. et al.

[11] Patent Number: 5,648,058

[45] Date of Patent: Jul. 15, 1997

[54] SYNTHESIS OF NOVEL MOLECULAR SIEVES USING A METAL COMPLEX AS A TEMPLATE

[75] Inventors: Kenneth J. Balkus, Jr., The Colony; Alexi G. Gabrielov, Plano, both of Tex.

[73] Assignee: Board of Regents, The Univ. of Texas System, Austin, Tex.

[21] Appl. No.: 439,415

[22] Filed: May 11, 1995

Related U.S. Application Data

[62] Division of Ser. No. 296,488, Aug. 24, 1994, Pat. No. 5,489,424.

[51] Int. Cl.⁶ .......................... C01B 37/02; C01B 37/08
[52] U.S. Cl. .................... 423/702; 423/703; 423/718; 423/DIG. 30; 502/64; 502/214
[58] Field of Search ................... 423/701, 702, 423/703, 718, DIG. 30; 502/64, 214

[56] References Cited

U.S. PATENT DOCUMENTS

| | | | |
|---|---|---|---|
| 4,100,262 | 7/1978 | Pelrine | 423/703 |
| 4,310,440 | 1/1982 | Wilson et al. | 502/208 |
| 4,440,871 | 4/1984 | Lok et al. | 502/214 |
| 4,556,549 | 12/1985 | Valyocsik | 423/702 |
| 4,568,654 | 2/1986 | Valyocsik | 502/62 |
| 4,744,970 | 5/1988 | Lok et al. | 502/214 |
| 5,091,073 | 2/1992 | Chang et al. | 423/718 |
| 5,094,828 | 3/1992 | Chu et al. | 423/DIG. 30 |
| 5,106,801 | 4/1992 | Zones et al. | 502/64 |
| 5,167,942 | 12/1992 | Balkus et al. | 423/705 |
| 5,316,753 | 5/1994 | Nakagawa | 423/706 |
| 5,334,367 | 8/1994 | Rosinski et al. | 423/704 |

OTHER PUBLICATIONS

Balkus et al. "The Synthesis & Characterization of UtD-1 . . ." ACS Anaheim California, Apr. 1995.

Balkus et al. "Synthesis of Nonasil Molecular Sieves in the Presence of Cobalticinium Hydroxide" *Microporous Matls.* 1 pp. 583–591 1993.

Balkus et al. "Synthesis of Aluminum Phosphate Molecular Sieves Using Cobalticinium Hydroxide" Microporous Material vol. 3 No. 4–5, Jan. 1995 p. 489.

Balkus et al. "Synthesis of NaX Zeolites With Metallophthalocyannes" *Supramolecular Achitecture*, ACS Symposium Series vol. 499, p. 347 1992.

Bekkum et al. "Introduction to Zeolite Science & Practice" *Studies in Surface Science & Catalysis* vol 58 p. 137 1991.

Kölle et al. "Decylmethylcobaltelen: Synthese und Umwandlung In Methylierte (Aren) (Cyclopentadienyl) Cobalt –Kationrn" *Chemische Berichde* vol. 114 p. 2926 1981.

Szostak *"Molecular Sieves: Principles of Synthesis & Identification"* pp. 92–101 1989.

Behrens et al. "Metal Organic Complexes As Templates For The Synthesis of Clathrasils" 8th Intl. Symp. on Mol Recounition & Inclusion p. 53.

Van der Gour et al. "The cobalticinium cation: A Metal–Organic Complex As A Novel Template For The Sinth of Clatyrasics" Z. Anory. Ally. Chem. vol 621 pp. 311–322 1995.

Meier & Olson *Altas of Zeolite Structures* pp. 22, 23 26, 27, 96, 97, 114, 115 & 180–181 1992.

*Primary Examiner*—Mark L. Bell
*Assistant Examiner*—David Sample
*Attorney, Agent, or Firm*—Arnold, White & Durkee

[57] ABSTRACT

The synthesis and characterization of novel molecular sieves containing bis(pentamethylcyclopentadienyl) cobalt(III) ion are described. Several types of molecular sieves were prepared using the cobalt metal complex as a template that was shown to be incorporated as a guest molecule within the molecular sieve. Molecular sieves prepared using bis (pentamethylcyclopentadienyl) cobalt(III) ion as template were characterized as having a pore size at least as large as 7 Å. Other molecular sieves were also prepared using bis(cyclopentadienyl) cobalt(III) templates. The compounds are attractive as catalysts in a wide range of applications.

10 Claims, 5 Drawing Sheets

SYNTHESIS OF NOVEL MOLECULAR SIEVES USING A METAL COMPLEX AS A TEMPLATE

This is a divisional of application Ser. No. 08/296,488 filed Aug. 24, 1994, now U.S. Pat. No. 5,489,424.

The United States Government has rights in the present invention pursuant to grant CHE-9157014 awarded by the National Science Foundation.

BACKGROUND OF THE INVENTION

1. Field of the Invention

The invention relates generally to synthesis of molecular sieve complexes and more specifically to the use of certain bis(cyclopentadienyl) cobalt ion complexes as structure directing agents or templates.

2. Description of Related Art

The incorporation of metal complexes during the synthesis of molecular sieves is known to be useful for synthesis of zeolite "Ship-in-a-bottle" complexes. NaX zeolites have been synthesized around metal phthalocyanines (Balkus, et al, 1992; Balkus and Kowalak, 1992). In a few cases the metal complex may also function as a structure directing agent during crystallization. The metal complex bis (cyclopentadienyl)cobalt(III) ion, $Cp_2Co^+$, has been reported to be a template for isostructural ZSM-51 and Nonasil in hydroxide and fluoride media as well as ZSM-45 (Balkus and Shepelev, 1993A, 1993B; U.S. Pat. No. 4,568, 654). Nonasil is described in U.S. Pat. No. 4,556,549 as an all-silica clathrasil type molecular sieve. The metal complex is completely encapsulated as indicated by the x-ray structure that shows the largest openings to the nonasil cages are 6-membered rings (Behrens and van de Goor, 1994).

The formation of many molecular sieves depends on the presence of template molecules that affect the gel chemistry and/or act as a void filler (R. Szostak, 1989). Most of the templates that have been evaluated for molecular sieve synthesis are based on organic molecules, particularly aliphatic amines. By comparison, the structure directing properties of metal complexes are relatively unexplored. Cobalticinium ion, $Cp_2CO^+$, has been shown to be a template for the clathrate type molecular sieves Nonasil and ZSM-51 as well as ZSM-45. In the case of ZSM-51, the template claimed for its synthesis was bis(cyclopentadienyl) cobalt (III) hexafluorophosphate. More recently, $Cp_2CoOH$ was shown to be a template for the aluminum phosphate molecular sieves $AlPO_4$-5 and $AlPO_4$-16. $Cp_2Co^+$ has been reported to produce the all-silica clathrasils octadecasil and dodecasil.

Recent work has thus indicated that the role of the metal and the effect of functionalizing the bis(cyclopentadienyl) rings may lead to new types of molecular sieves when these agents are used as structure directing agents. However, the structure directing effects for synthesis of molecular sieves are largely unpredictable and not well understood. The availability of novel molecular sieves would be beneficial in extending the range of zeolite type catalysts and in semiconductor applications.

SUMMARY OF THE INVENTION

The present invention addresses problems inherent in the art by providing novel molecular sieve compounds and processes for producing the novel compounds. The present work shows that certain metal complexes can be employed as templates or structure-directing agents. Several new molecular sieve compounds have been produced. The compounds are microcrystalline and microporous and incorporate the templating agent metal used in the formation of the compound.

In particular, bis(cyclopentadienyl)cobalt(III) ion $(Cp_2Co^+)$, has been shown to be a template for synthesis of the aluminum phosphate molecular sieves exemplified by $AlPO_4$-5 and $AlPO_4$-16. This is an unexpected finding to the extent that this metal complex will provide a template for both channel ($AlPO_4$-5) and cage ($AlPO_4$-16) molecular sieves. The $Cp_2Co^+$ complex is relatively rigid, unlike many typical organic templates. This provides an opportunity to evaluate the effects of size, shape and symmetry on the structure directing properties of the complex by the modifying the Cp ring(s) with different substituents.

Employing a fully methylated derivative, bis (pentamethylcyclopentadienyl) cobalt(III) ion $(Cp_2^*Co^+)$, the inventor has produced five new molecular sieves. It is contemplated that other new molecular sieves can be produced by altering the template; for example, any combination of alkyl groups on the cyclopentane ring such as methyl, ethyl, propyl, etc. as well as various metal species such as $Ni^{2+}$, $Fe^{2+}$, and other Group VIII metal ions. Nevertheless, the properties of these templates would be expected to differ from the bis pentamethylcyclopentadienyl species employed in the present invention.

The different metal complexes so far studied have unique structure directing properties, such that bis (cyclopentadienyl)cobalt(III) ion does not promote formation of the same structures as bis (pentamethylcyclopentadienyl) cobalt(III) ion. This is likely due to the different features of each complex, including size, shape and charge distribution.

Overall, and in general, the invention discloses novel microcrystalline molecular sieves prepared from template directing metallo organic complexes. In particular embodiments, a metal microcrystalline silica molecular sieve with a nominal pore diameter of at least 7.2 Å is formed. Such silica molecular sieves incorporate the positively charged metal ion as a guest molecule. Among the unique structures produced using the $(Cp_2^*Co^+)$ ion is a microcrystalline silica molecular sieve characterized as a yellow crystalline product, UTD-1. UTD-1 was prepared as a single phase product employing bis (pentamethylcyclopentadienyl) cobalt(III) ion as template. The crystalline material was formed from a gel containing sodium hydroxide, the organic metal template and fumed silica. UTD-1 is formed from a gel with the approximate molecular ratio of water to $SiO_2$ of about 60, sodium ion to $SiO_2$ of about 0.1, hydroxyl ion to silica $SiO_2$ of about 0.2 and the bis(pentamethylcyclopentadienyl) cobalt(III) ion template ratio to $SiO_2$ of about 0.1. The x-ray diffraction powder patterns for the UTD-1 as synthesized and the calcined material indicate the uniqueness of the molecular sieve. As expected, there is decomposition of the organic portion of the template after calcination at 500° C. The overall structure, however, is quite stable. The bright yellow color of UTD-1 indicates that the pentacyclodienyl metal ion complex is entrapped in the crystals as a guest molecule. The metal complex template is relatively large and is not removed by either aqueous or organic extraction procedures. Channels or cages within the molecular complex therefore are at least as large as the $Cp^*$ rings that measure approximately 7.2 Å. UTD-1 is also a relatively large pore material as suggested by the low angle reflections obtained on x-ray crystallographic measurement.

While UTD-1 is quite stable, there is an indication of decomposition at approximately 350° C. Calcination is accompanied by a change in color from yellow to pale green. It is likely that this change of color represents decomposition of the organic portion of the metal complex with concomitant formation of metal oxide. There was no evidence of framework substitution by the cobalt during formation of the molecular sieve.

Yet another embodiment of the present invention is illustrated in the formation of the molecular sieve UTD-2. This compound also incorporates $Cp^*_2Co$ as a guest molecule but is different in structure in incorporating aluminum and phosphorous as part of the framework. UTD-2 is also obtained as a single phase product from a gel having molar ratios of 1:0.9:0.4:0.86:0.025:50 for the components $Al_2O_3:P_2O_5:SiO_2:(TPA)_2O:(CP^*_2Co)_2O:H_2O$. Of course, these ratios may be varied somewhat. The preferred $Al_2O_3/SiO_2$ molar ratio is 2.5, although ranges as high as 4 or as low as 1 are also suitable. Using ratios outside of the range 4>2.5>1 typically results in an amorphous material. A convenient procedure for the preparation of UTD-2 and similar molecular sieves is to prepare two mixtures; mixture 1 from aluminum hydroxide and phosphoric acid and mixture 2 from silica, preferably fumed silica, $CP^*_2Co^+$ hydroxide, and tetrapropylammonium hydroxide. Of course, one may vary not only the ratios but the type of quaternary ammonium compound employed; for example, other tetra alkyl ammonium hydroxides. UTD-2 is conveniently formed after mixing mixture 1 and mixture 2, heating for a period of time at approximately 200° C. cooling, diluting and separating the crystalline material. UTD-2, like UTD-1, is yellow, indicating inclusion of the metal template within the molecular sieve.

The novel compound UTD-2 may also be prepared using only $Cp^*_2CoOH$ as template. The presence of tetrapropyl ammonium hydroxide, however, appears to be conducive to obtaining better yields of UTD-2. When using only $Cp^*_2CoOH$ as the template, gels with molar ratios of about 1:0.9:0.4:0.32:50 to $Al_2O_3:P_2O_5:SiO_2(Cp^*_2Co)_2O:H_2O$ may be employed as preferred ratios. Variations of $Al_2/SiO_2$ may be employed as previously discussed, preferably in the range of 4>2.5>1.

A new component, UTD-5, also resulted from the single template synthetic procedure used to obtain UTD-2. The new material UTD-5 was distinguishable from UTD-2 in its x-ray pattern as synthesized from the gel mixture and also after calcination at 500° C. The unusual dark green color of the calcined UTD-5 suggested formation of cobalt oxide and/or possibly the free metal.

Yet another embodiment of the present invention, the unsubstituted form of bis(cyclopentadienyl) cobalt(III), was used as a template to form a UTD-3/SAPO compound. The cobalt ion template was used in combination with tetrapropylammonium hydroxide. This compound was prepared using procedures analogous to those used to prepare UTD-2 except that the second mixture incorporated $Cp_2CoOH$ rather than $Cp^*_2CoOH$. Preferred molar ratios for $Al_2O_3:P_2O_5:SiO_2:(TPA)_2O:(CP_2CO)_2O:H_2O$ were about 1:0.9:0.4:0.86:0.025:48. The new UTD-3 SAPO compound was yellow in color, microcrystalline, and like the other compounds, changed color after calcination at 500° C. The new compound had a unique x-ray powder diffraction pattern. The calcined sample was a sky-blue color after heating for several hours at 500° C. UTD-3 could also be prepared as a single phase from the gel containing cobalt(II) ions instead of silica and $Cp_2CoOH$ as the only template. This UTD-3 compound is a modification of the UTD-3 to the extent that it is isolated as a dark blue-green product; however, it is single phase and has an x-ray diffraction pattern substantially the same as UTD-3. UTD-3-CoAPO is prepared by mixing phosphoric acid, a cobalt salt, preferably cobalt sulfate, then adding aluminum hydroxide and the bis(cyclopentadienyl) cobalt(III) hydroxide template, mixing the gel for several hours, e.g., approximately four hours, and then heating at about 200° C. for about a day, i.e., 18 to 24 hours, to provide a single phase product. Preferred molar ratios for $Al_2O_3:P_2O_5:CoO:(Cp2Co)_2O:H_2O$ are about 0.8:1:0.4:0.75:53. However, the ratios may be employed within this general range to obtain UTD-3 CoAPO.

Yet another embodiment of the present invention UTD-6 may be prepared again employing the bis (pentamethylcyclopentadienyl) cobalt(III) template. In a particular embodiment, UTD-6 was prepared using two templates, the bis(cyclopentadienyl) complex and tetrabutylammonium hydroxide. The compound was prepared from a silicoaluminum phosphate gel. The preferred component molar ratios were about 1:0.9:0.4:0.86:0.16:75 for $Al_2O_3:P_2O_5:SiO_2:(TBA)_2O:H_2O$. UTD-6 was conveniently prepared by admixing two mixtures; the first containing aluminum hydroxide and phosphoric acid; and the second containing fumed silica and the two templates.

The five new molecular sieve compounds described above are illustrative of the types of new compounds that may be prepared using a metal organic complex. For the first time, the inventors have shown the structure directing properties of cobalticinium ion complexes and that have demonstrated molecular sieves can be formed without an organo cation. The present invention illustrates the general types of novel structures that may be produced in the presence of bis (pentamethylcyclopentadienyl) cobalt(III) ion as the template. It is possible that even larger pore materials may be produced by increasing the bulkiness of the Complex cobalt (III) ion; for example, by appropriate substituent groups on the cyclopentane rings.

While the complete range of reactions and properties of the new microcrystalline metal molecular sieves has not been explored, it is recognized that related compounds have been well utilized as catalysts. More specifically, such compounds have been used in catalytic hydrofining, cracking, and as selective adsorbants. Many of these uses are described in more detail in U.S. Pat. No. 4,440,871 incorporated herein by reference where it is noted that in general silicon aluminum phosphate molecular sieves are similar to zeolite catalysts in several of their properties.

By analogy with the $Cp_2Co^+$/nonasil complexes, the new molecular sieves are expected to exhibit special optical effects that could be exploited in memory storage devices. Molecular sieves are increasingly being developed as sensors in semiconductor devices.

DETAILED DESCRIPTION OF THE PREFERRED EMBODIMENTS

Figure 1A:
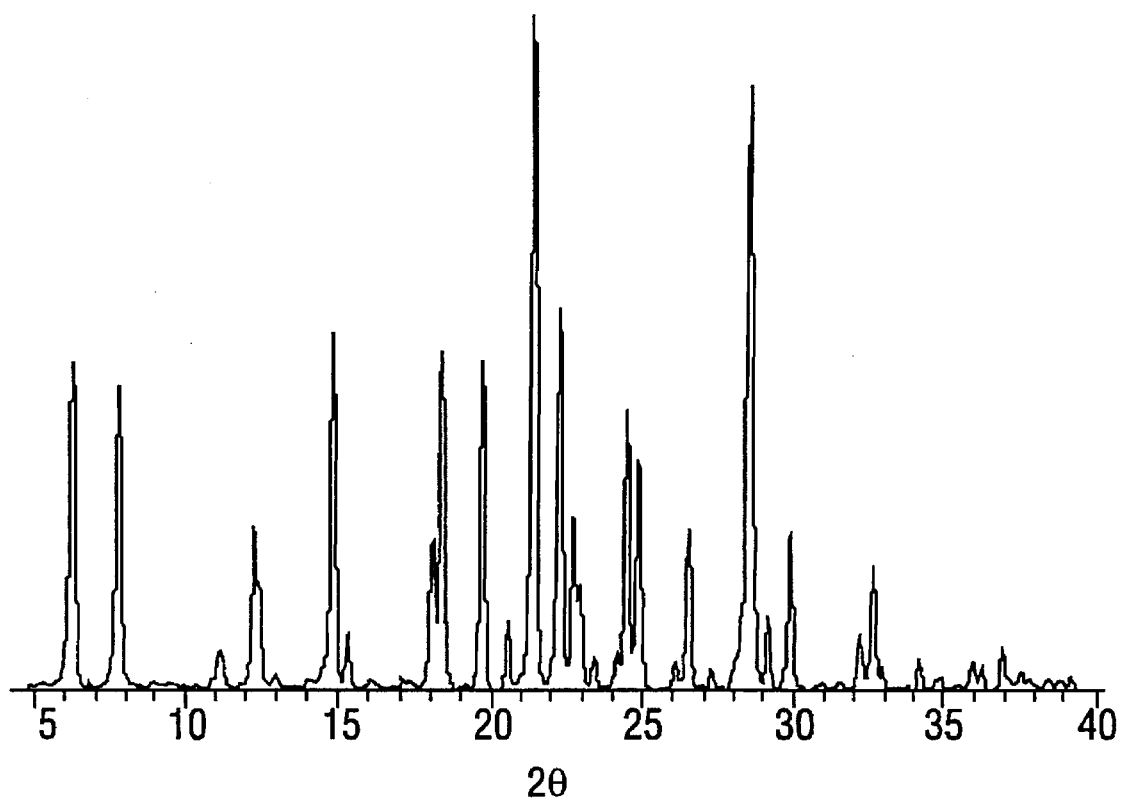
FIG. 1A. Powder x-ray diffraction pattern of UTD-1 as synthesized.

The templating ability of metallocenes in the synthesis of crystalline microporous metal oxides is the general focus of the present invention. The inventors have prepared and characterized a series of novel silica type molecular sieves, designated as "UTD" compounds. The novel structures are produced in the presence of bis (pentamethylcyclopentadienyl)cobalt(III) ion, $Cp^*_2Co^+$, as the template. Since the less bulky $Cp_2Co^+$ appeared to favor formation of the smaller pore clathrate type molecular sieves, the inventors have reasoned that addition of methyl groups to the cyclopentadienyl rings will encourage the crystallization of larger pore materials.

It is known that the crystallization of zeolite molecular sieves in the presence of metal chelates may result in encapsulation of the complexes (U.S. Pat. No. 5,167,942). This is a viable method for the preparation of zeolite ship-in-a-bottle complexes (Balkus and Gabrielov, 1994); however, the metal complex may also serve as a structure directing agent. The formation of many molecular sieves depends on the presence of template molecules that affect the gel chemistry and/or act as a void filler.

Most of the templates that have been evaluated for molecular sieve synthesis are based on organic molecules, especially aliphatic amines. By comparison, the structure directing properties of metal complexes are virtually unknown. Cobalticinium ion, $Cp_2Co^+$, has been shown to be a template for the clathrate type molecular sieves Nonasil and ZSM-51 (Balkus and Shepelev, 1993; Balkus and Shepelev, 1993B; U.S. Pat. No. 4,568,564). More recently, work in the inventors' laboratory showed that $Cp_2CoOH$ acts as a template for the production of $AlPO_4$-16 and SAPO-16. Molecular sieves of this type had previously required an organo-cation to form and, specifically in the case of $AlPO_4$-16 or SAPO-16, only quinuclidene was known to generate this topology.

The following examples are provided for purposes of clarification and should not be considered as limiting. One skilled in the art would recognize in light of the present disclosure that although the specified materials and conditions are important in practicing the invention, unspecified materials and conditions are not excluded as long as they do not prevent the benefits of the invention from being realized.

EXAMPLE 1

This example illustrates the preparation of an all-silica molecular sieve using a bis(pentamethylcyclopentadienyl) cobalt(III) ion as a template. The microcrystalline silica molecular sieve incorporates the complexed cobalt ion, apparently as a guest molecule.

Preparation of UTD-1

The metal complex $Cp^*_2CoPF_6$ was prepared according to the literature procedure (Kolle and Khouzami, 1981). The complex was converted to the chloride derivative over Dowex-50W cation exchange resin by first adsorbing the $Cp^*_2Co^+$ ion followed by elution with 1M HCl. The $Cp^*_2CoCl$ was then transformed to the hydroxide form over an aqueous slurry of silver oxide at 70° C. The concentration of the brown $Cp^*_2CoOH$ solution was determined by potentiometric titration. The solution was then used in the molecular sieve synthesis.

UTD-1 was prepared as a single phase product by combining NaOH, a 31.6% aqueous $Cp^*_2CoOH$ solution and fumed silica to form a gel with the following molar ratios.

| | |
|---|---|
| $H_2O/SiO_2$ | 60 |
| $Na^+/SiO_2$ | 0.1 |
| $OH^-/SiO_2$ | 0.2 |
| $CP^*_2Co^+/SiO_2$ | 0.1 |

The gel was aged with stirring for 1 hour and then transferred to a 23 mL Teflon-lined pressure reactor (Parr). The reactor was heated at 175° C. under static conditions for 2 days. The resulting yellow crystalline product was washed with deionized water, suction filtered and then dried at 90° C. for 2 hours.

Figure 1B:
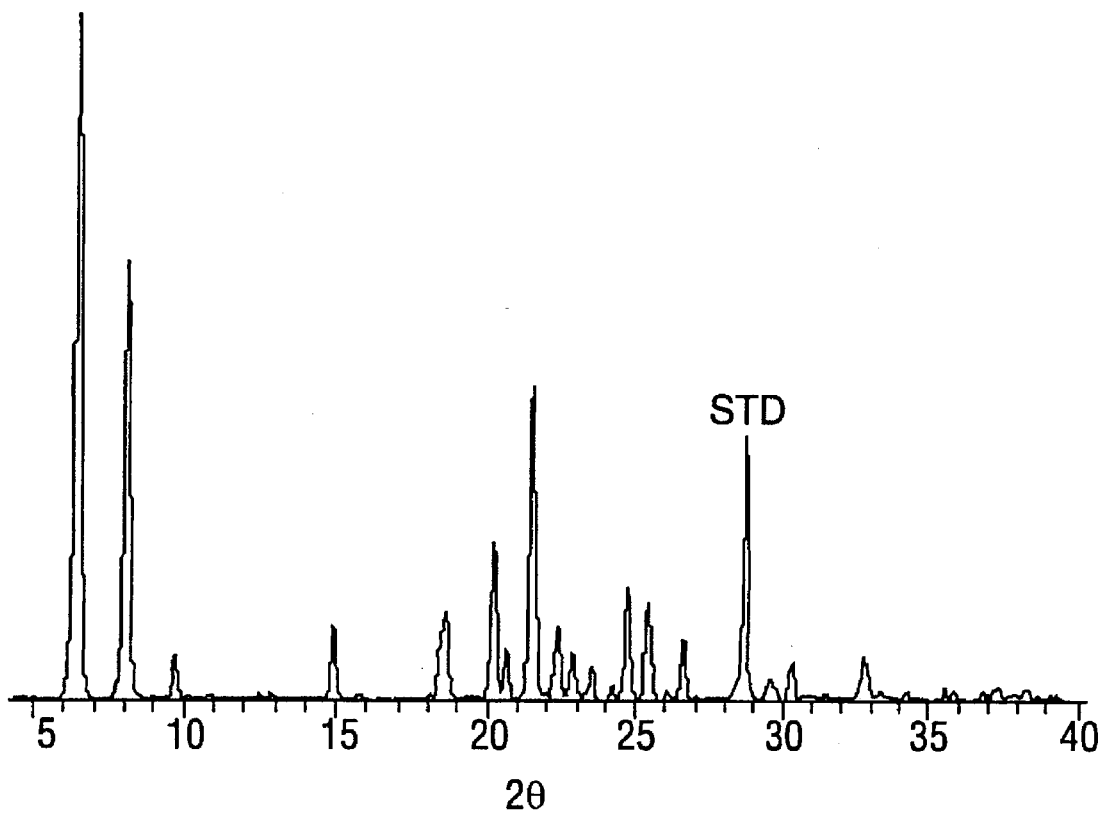
FIG. 1B. Powder x-ray diffraction pattern of UTD-1 after calcination (500° C., 4 hr) samples. $CaF_2$ was used as an internal standard.
Figure 2:
FIG. 2. Scanning electron micrograph of UTD-1.

FIG. 1A shows the X-ray diffraction (XRD) powder pattern data for UTD-1 as synthesized. FIG. 1B shows the XRD of calcined UTD-1. Although there are changes in peak intensity after calcination at 500° C. and decomposition of the template occurs, the structure appears quite stable. FIG. 2 shows the bundles of rectangular shaped crystals obtained after synthesis. These results support a single phase material. The bright yellow color of UTD-1 indicated that the $Cp^*_2Co^+$ template was entrapped in the crystals as a guest molecule. The metal complex cannot be removed by aqueous or organic extraction. This implied that the channels or cages were at least as large as the $Cp^*$ rings (7.2 Å) in order to accommodate the complexes. The low angle reflections in FIGS. 1A and 1B also suggested a large pore material. Additionally, preliminary adsorption experiments using calcined UTD-1 indicated a ~20% by weight increase upon exposure to cyclohexane (kinetic diameter 6.0 Å). Pore size determination by more direct adsorption methods is complicated by the occluded cobalt species.

TABLE 1A (UTD-1 as synthesized)

| | d | % |
|---|---|---|
| 1. | 14.686 | 48 |
| 2. | 11.742 | 44 |
| 3. | 8.068 | 6 |
| 4. | 7.339 | 23 |
| 5. | 6.058 | 53 |
| 6. | 5.872 | 8 |
| 7. | 6.459 | 50 |
| 8. | 4.9754 | 50 |
| 9. | 4.892 | 10 |
| 10. | 4.553 | 100 |
| 11. | 4.031 | 57 |
| 12. | 4.193 | 25 |
| 13. | 3.913 | 15 |
| 14. | 3.829 | 5 |
| 15. | 3.710 | 5 |
| 16. | 3.668 | 41 |
| 17. | 3.611 | 34 |
| 18. | 3.448 | 4 |
| 19. | 3.390 | 23 |
| 20. | 3.206 | 5 |
| 21. | 3.084 | 11 |
| 22. | 3.006 | 23 |
| 23. | 2.799 | 8 |
| 24. | 2.763 | 18 |
| 25. | 2.738 | 3 |
| 26. | 2.637 | 4 |
| 27. | 2.509 | 4 |
| 28. | 2.489 | 3 |
| 29. | 2.445 | 7 |
| 30. | 2.406 | 3 |

TABLE 1B (calcined at 500° C.)

| d | % |
|---|---|
| 14.620 | 100 |
| 11.509 | 64 |
| 9.466 | 6 |
| 6.094 | 10 |
| 4.882 | 13 |
| 4.478 | 23 |
| 4.384 | 7 |
| 4.211 | 45 |

TABLE 1B-continued (calcined at 500° C.)

| d | % |
|---|---|
| 4.049 | 10 |
| 3.955 | 6 |
| 3.843 | 5 |
| 3.735 | 2 |
| 3.659 | 17 |
| 3.560 | 14 |
| 3.400 | 9 |
| 3.066 | 3 |
| 3.066 | 5 |
| 2.769 | 6 |
| 2.646 | 1 |
| 2.553 | 1 |
| 2.466 | 1 |
| 2.436 | 2 |
| 2.374 | 2 |

There was no evidence of complex decomposition during synthesis from spectroscopic analysis of encapsulated and free complexes. The UV-Vis spectrum of a UTD-1 nujol mull was broadened and slightly red shifted (<15 nm) compared to an aqueous solution of $Cp^*_2CoOH$ (290, 338sh, 406sh nm). However, this shift to lower energy was also noted for $Cp_2Co^+$ in Nonasil and $AlPO_4$-5 molecular sieves (Balkus and Shepelev, 1993A). Thermogravimetric analysis (TG) of $Cp^*_2CoPF_6$ indicated the onset of decomposition at ~350° C., which is significantly higher than the UTD-1 synthesis temperature (175° C.). Similarly, UTD-1 begins to lose weight at ~350° C. with a change in color from yellow to pale green. Only a 5% weight change was measured up to 900° C. The small change is consistent with loss of the organics and probable formation of occluded oxides.

There was no evidence of framework substitution by cobalt. The FT-IR spectrum of UTD-1 also indicated the presence of intact $Cp^*_2Co^+$ as evidenced by the $v_{CH}$ at 2915 $cm^{-1}$ that can be compared to the free $Cp^*_2CoPF_6$ complex with a C—H band at 2920 $cm^{-1}$. Similarly, a C—C stretch at 1476 $cm^{-1}$ for the free complex appeared at 1480 $cm^{-1}$ in UTD-1. There were a variety of other bands that might be ascribed to the encapsulated metal complex; however, they were either masked by the bands associated with the molecular sieve or were quite weak.

Figure 3A:
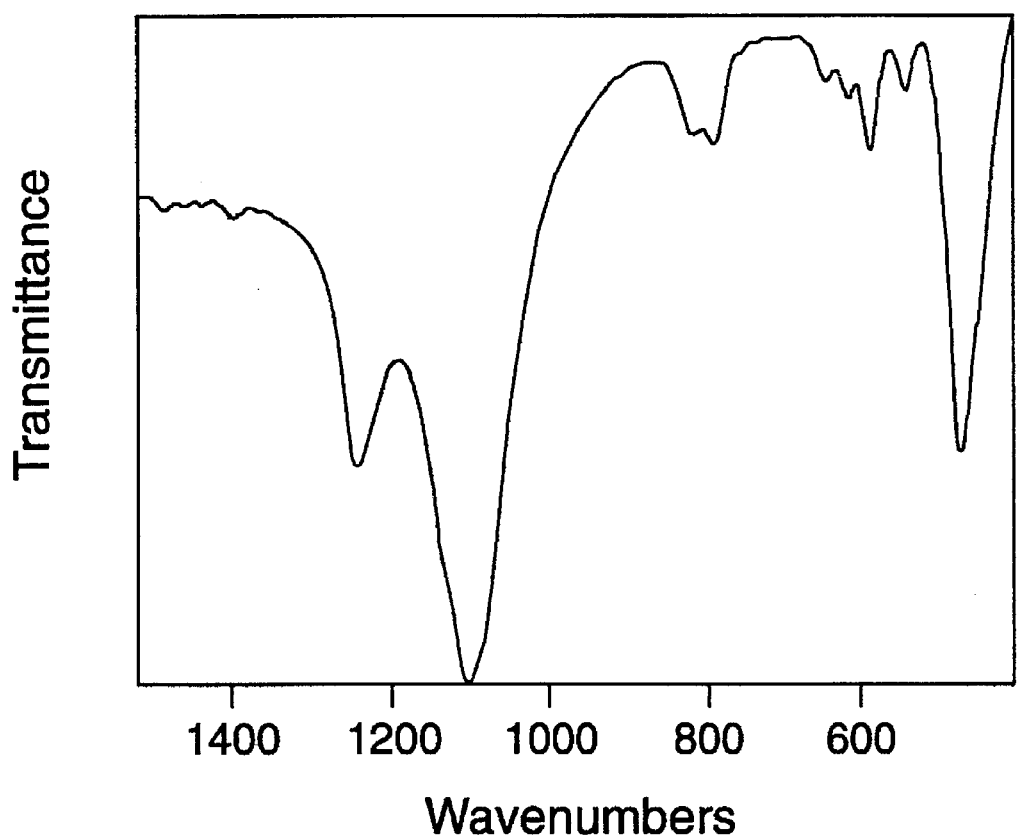
FIG. 3A. FT-IR spectra for UTD-1 as synthesized. Sample prepared as KBr pellet.
Figure 3B:
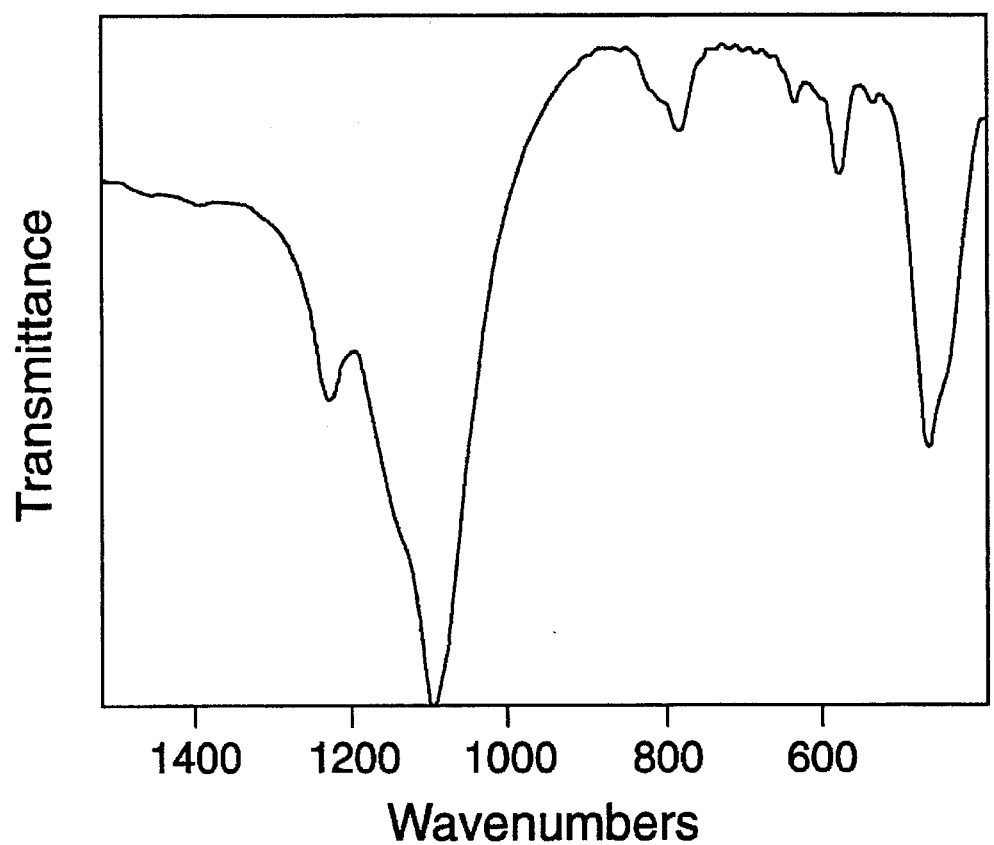
FIG. 3B. FT-IR spectrum of UTD-1 after calcination (500° C.) Sample prepared as KBr pellet.

FIG. 3A shows the FT-IR spectrum in the region 1500-400 $cm^{-1}$ for UTD-1 as synthesized. FIG. 3B shows the FT-IR spectrum after calcination at 500° C. There are two strong bands at 1237 and 1092 $cm^{-1}$ that are typical of the asymmetric Si—O stretches observed for crystalline silicates. There are no significant shifts for these bands after calcination; however, two shoulders are resolved at 1140 and 1076 $cm^{-1}$. The bands that appear in the symmetric stretching region (812, 787, 642 $cm^{-1}$), as well as the more structure sensitive region (612, 582 and 537 $cm^{-1}$), appear quite different from known silicate phases.

The results indicate that an all-silica phase UTD-1 can be synthesized using the metal complex $Cp^*_2CoOH$ as a template that becomes incorporated as a guest molecule. The data indicate that UTD-1 is a large pore material (>7 Å).

EXAMPLE 2

Another new molecular sieve was prepared as illustrated in the following example. This compound, like UTD-1, also incorporates the template $Cp^*_2Co^+$ as a guest molecule but differs in including aluminum and phosphorus as part of the framework.

Preparation of UTD-2

UTD-2 was obtained as a single phase product from a gel having molar ratios $Al_2O_3:P_2O_5:SiO_2:(TPA)_2O:(CP^*_2Co)_2O:H_2O$—1:0.9:0.4:0.86:0,025:50. The preferred $Al_2O_3/SiO_2$ molar ratio is 2.5. Taking the $Al_2O_3/SiO_2$ ratios out of the range 4>2.5>1 may result in an amorphous material. The procedure involves first preparing two mixtures as follows.

Mixture 1 was prepared by slowly adding 2 g of aluminum hydroxide (Pfaltz & Bauer, LOT 039789, 83.34 wt %) to a solution of 2.22 g 85 wt % $H_3PO_4$ (Fisher) and 2.0 g of deionized water with magnetic stirring. After adding about 1.3 g of the hydroxide, the gel became extremely viscous and was stirred with a Teflon rod for 1 hour.

Mixture 2 was prepared by adding 0.256 g fumed silica (0.007 μ, Aldrich) to a mixture of 0.58 g of a 30 wt % $Cp^*_2CoOH$ solution in water and 9.28 g of 40 wt % tetrapropylammonium hydroxide (TPAOH obtained from Alfa). Mixture 2 was not viscous and easily obtained homogeneity.

Mixture 2 was added slowly to mixture 1 and the final mixture was stirred for approximately 6 hours in order to achieve a homogeneous gel. The gel was transferred into a 25 $cm^3$ Teflon-lined pressure reactor (Parr) that was subsequently placed in an oven having a constant temperature of 200° C. After 20 hrs heating at autogenous pressure, the mixture was cooled to room temperature and diluted with 100 mL of deionized water. The bright yellow crystals were separated from a white amorphous material by centrifugation and/or sedimentation, washed with deionized water and isolated by filtering through a nitrocellulose membrane (2 μm) under suction. The solid yellow residue was dried at room temperature for 24 hrs. UTD-2 appeared on SEM images as a single phase.

TABLE 2

X-ray pattern for UTD-2 as synthesized

| # | 2 theta | d, Å | (rel.int., %) |
|---|---|---|---|
| 1. | 6.270 | 14.085 | (100) |
| 2. | 11.307 | 7.819 | (4) |
| 3. | 11.720 | 7.545 | (3) |
| 4. | 12.542 | 7.052 | (9) |
| 5. | 18.844 | 4.705 | (27) |
| 6. | 19.272 | 4.602 | (50) |
| 7. | 20.267 | 4.378 | (23) |
| 8. | 23.014 | 3.861 | (2) |
| 9. | 25.215 | 3.529 | (61) |
| 10. | 27.062 | 3.292 | (6) |
| 11. | 31.903 | 2.803 | (3) |
| 12. | 33.695 | 2.658 | (12) |
| 13. | 34.283 | 2.614 | (7) |
| 14. | 36.014 | 2.492 | (1) |
| 15. | 38.165 | 2.356 | (1) |

EXAMPLE 3

UTD-2 could be also obtained using only $Cp^*_2CoOH$ as template, as shown in the following example.

Single Template Synthesis of UTD-2

The single template synthesis of UTD-2 was substantially the same as that described in Example 2 except that mixture 2 was prepared by adding 0.256 g fumed silica to 7.76 g of a 30 wt % $Cp^*_2CoOH$ solution in water. The final gel had molar ratios $Al_2O_3:P_2O_5: SiO_2:(Cp^*_2Co)_2O:H_2O$= 1:0.9:0.4:0.32:50. The x-ray pattern of the yellow sample obtained after crystallization and purification indicated the presence of UTD-2 (about 30%) and a second component, UTD-5. Most of the peaks of UTD-5 are broad. UTD-5 was isolated by sedimentation and/or centrifugation of the more dense layer.

TABLE 3

X-ray Pattern for UTD-5 as Synthesized

| # | 2 theta | d, A | (rel.int., %) |
|---|---------|------|---------------|
| 1 | 6.51 | 13.57 | (24) |
| 2 | 10.89 | 8.12 | (16) |
| 3 | 12.31 | 7.18 | (21) |
| 4 | 12.92 | 6.85 | (31) |
| 5 | 13.12 | 6.740 | (30) |
| 6 | 16.78 | 5.28 | (55) |
| 7 | 20.88 | 4.25 | (100) |
| 8 | 22.12 | 4.02 | (71) |
| 9 | 23.13 | 3.84 | (25) |
| 10 | 26.51 | 3.36 | (24) |
| 11 | 29.21 | 3.06 | (31) |
| 12 | 32.07 | 2.79 | (20) |

TABLE 4

X-ray pattern for UTD-5 calcined at 500° C. (dark green)

| # | 2 theta | d, A | (rel.int., %) |
|---|---------|------|---------------|
| 1 | 6.48 | 13.63 | (92) |
| 2 | 7.52 | 11.75 | (46) |
| 3 | 12.45 | 7.10 | (42) |
| 4 | 21.04 | 4.22 | (96) |
| 5 | 21.30 | 4.17 | (100) |
| 6 | 22.30 | 3.98 | (62) |
| 7 | 24.48 | 3.63 | (33) |

EXAMPLE 4

This example illustrates the formation of a novel microcrystalline molecule sieve using bis(cyclopentadienyl)cobalt(III) ion as the template.

Preparation of UTD-3-SAPO

Mixture 1 was prepared as described in Example 2. Bis(cyclopentadienyl)cobalt(III) hydroxide ($Cp_2CoOH$) was used as a template in combination with tetrapropylammonium hydroxide (TPAOH).

Mixture 2 was prepared by adding 0.256 g fumed silica to a mixture of 0.354 g of a 31 wt % $Cp_2CoOH$ solution in water and 9.28 g of 40 wt % tetrapropylammoniumhydroxide. The molar ratios were as follows: $Al_2O_3:P_2O_5:SiO_2:(TPA)_2O:(Cp_2Co)_2O:H_2O=1:0.9:0.4:0.86:0.025:48$. The crystallization and purification procedures were similar to those described in Example 2. The top and bottom layers (white material) were separated from the intermediate bright yellow fraction by sedimentation and/or centrifugation. The yellow fraction was isolated as UTD-3. The yellow sample turned sky-blue after calcination at 500° C. X-ray powder diffraction patterns for UTD-3 are shown in Table 5 for the synthesized compound and in Table 6 after calcination.

TABLE 5

X-ray pattern for UTD-3 as synthesized (yellow)

| # | 2 theta | d, A | (rel.int., %) |
|---|---------|------|---------------|
| 1 | 8.588 | 10.288 | (3) |
| 2 | 10.898 | 8.112 | (5) |
| 3 | 15.936 | 5.557 | (11) |
| 4 | 17.279 | 5.128 | (80) |
| 5 | 17.694 | 5.009 | (14) |
| 6 | 20.805 | 4.266 | (23) |
| 7 | 21.919 | 4.052 | (100) |
| 8 | 23.278 | 3.818 | (37) |
| 9 | 24.790 | 3.589 | (4) |
| 10 | 26.938 | 3.307 | (6) |
| 11 | 28.226 | 3.159 | (20) |
| 12 | 31.313 | 2.854 | (4) |
| 13 | 32.171 | 2.780 | (24) |
| 14 | 34.202 | 2.620 | (14) |
| 15 | 34.956 | 2.565 | (8) |
| 16 | 35.881 | 2.507 | (5) |

TABLE 6

X-ray pattern for UTD-3 calcined 550° C. (blue color)

| # | 2 theta | d, A | (rel.int., %) |
|---|---------|------|---------------|
| 1 | 8.639 | 10.227 | (15) |
| 2 | 10.926 | 8.091 | (49) |
| 3 | 13.466 | 6.570 | (51) |
| 4 | 15.903 | 5.568 | (15) |
| 5 | 17.292 | 5.124 | (78) |
| 6 | 17.642 | 5.023 | (13) |
| 7 | 20.832 | 4.261 | (44) |
| 8 | 21.946 | 4.074 | (100) |
| 9 | 23.279 | 3.818 | (31) |
| 10 | 24.885 | 3.575 | (13) |
| 11 | 26.991 | 3.301 | (15) |
| 12 | 28.226 | 3.159 | (20) |
| 13 | 29.316 | 3.044 | (11) |
| 14 | 32.229 | 2.775 | (24) |
| 15 | 32.375 | 2.763 | (25) |
| 16 | 34.264 | 2.615 | (13) |
| 17 | 37.714 | 2.383 | (11) |

EXAMPLE 5

UTD-3 can be prepared as a single phase from the gel containing $Co^{2+}$ ions instead of silica and $Cp_2CoOH$ as the only template.

Synthesis of UTD-3-CoAPO 3.4 g $H_2O$ and 3.10 g 85% $H_3PO_4$ were mixed with 1.5 g $CoSO_4 \cdot 7H_2O$ and stirred for thirty minutes. 2.0 g $Al(OH)_3$ (83.34%) was slowly added to the solution and mixed for 1 hr. Then, 13.4 g of a 26.6% $Cp_2CoOH$ solution was added to the mixture. The molar ratios were $Al_2O_3:P_2O_5:CoO:(Cp_2Co)_2O:H_2O=0.8:1:0.4:0.75:53$. The gel was mixed for 4 hrs, and then placed in an oven at 200° C. for 19 hours. The dark blue-green product was a pure single phase. The x-ray pattern was similar to that of UTD-3 shown in Table 5.

EXAMPLE 6

The compound described in the following example was prepared using two templates, one of which was $Cp^*_2CoOH$.

Preparation of UTD-6

UTD-6 was prepared from silicoaluminum phosphate gel using a $Cp^*_2CoOH$ and tetrabutylammonium hydroxide (TBAOH) as templates. The molar ratios were $Al_2O_3:P_2O_5:SiO_2:(TBA)_2O:H_2O=1:0.9:0.4:0.86:0.16:75$.

Mixture 1 was prepared by slow addition of 2 g of aluminum hydroxide (Pfaltz & Bauer, LOT 039789, 83.34 wt %) to a solution of 2.22 g 85 wt % $H_3PO_4$ (Fisher) and 2.0 g of deionized water with magnetic stirring. After addition of about 1.3 g of the hydroxide, the gel became extremely viscous and was stirred with a Teflon rod for 1 hour.

Mixture 2 was prepared by adding 0.256 g fumed silica (0.007 m, Aldrich) to a mixture of 4.34 g of a 26.6 wt % $Cp^*_2CoOH$ solution in water and 11.92 g of 40 wt % TBAOH (obtained from Alfa). Mixture 2 was not viscous and easily obtained homogeneity.

Mixture 2 was added slowly to mixture 1 and the final mixture was stirred for approximately 6 hrs in order to achieve a homogeneous gel. The gel was transferred into a 25 cm³ Teflon-lined pressure reactor (Parr) that was subsequently placed in an oven having a constant temperature of 200° C. After 20 hours heating at autogeneous pressure, the mixture was cooled to room temperature and diluted with 100 mL of deionized water. The yellow product was isolated by filtration and washed with copious amounts of water.

TABLE 7

X-ray pattern for UTD-6 as synthesized

| # | 2 theta | d, A | (rel.int., %) |
|---|---------|-------|---------------|
| 1 | 5.35 | 16.49 | (100) |
| 2 | 6.44 | 13.72 | (61) |
| 3 | 11.90 | 7.43 | (21) |
| 4 | 17.49 | 5.07 | (71) |
| 5 | 19.77 | 4.49 | (43) |
| 6 | 29.03 | 3.07 | (50) |
| 7 | 30.91 | 2.89 | (25) |
| 8 | 35.30 | 2.54 | (32) |
| 9 | 35.74 | 2.51 | (21) |
| 10 | 35.81 | 2.50 | (21) |

REFERENCES

The following references to the extent that they provide exemplary procedural or other details supplementary to those set forth herein are specifically incorporated herein by reference.

K. J. Balkus, Jr. and S. Kowalak, U.S. Pat. No. 5,167,942, 1992.

K. J. Balkus, Jr. and S. Shepelev, *Micropor. Mater.*, 1993A, 1, 383.

K. J. Balkus, Jr. and S. Shepelev, *Petrol. Preprints*, 1993B, 38, 512.

Behrens, P. and van de Goor, G.

E. W. Valyecsik, U.S. Pat. No. 4,568,654, 1986.

Valyecsik, E. W., U.S. Pat. No. 4,556,549 (Dec. 3, 1985).

U. Kölle and F. Khouzami, *Chem. Ber.*, 1981, 114, 2929.

Balkus, K. J., Jr., Hargis, C. D. and Kowalak, S., *ACS Symp. Ser.* 449, 348 (1992).

Szostak, R. in *Molecular Sieves*, Van Nostrand, New York, N.Y., p. 79, 84, 1989.

What is claimed is:

1. A metal microcrystalline silicoaluminophosphate molecular sieve having a nominal pore diameter greater than about 7.2. A and comprising $Al_2O_3$ and $SiO_2$ in a molar ratio of about 2.5 and $(Cp^*_2Co)_2O$ where $Cp^*_2Co$ is bis (pentamethylcyclopentadienyl) cobalt III ion.

2. The metal microcrystalline silicoaluminophosphate molecular sieve of claim 1 wherein said compound is prepared from a gel comprising $Al_2O_3$, $P_2O_5$, $SiO_2$, $(TPA)_2O$, $(Cp^*_2Co)_2O$ and $H_2O$ in a molar ratio of about 1:0.9:0.4:0.86:0.025:50 where $Cp^*_2Co$ is bis (pentamethylcyclopentadienyl) cobalt (III) ion and TPA is tetrapropylammonium ion.

3. The metal microcrystalline silicoaluminophosphate molecular sieve of claim 1 which is identified as UTD-2.

4. The metal microcrystalline silicoaluminophosphate molecular sieve of claim 1 that as synthesized has an x-ray diffraction pattern including lines shown in Table 2.

5. The metal microcrystalline silicoaluminophosphate molecular sieve of claim 1 that is prepared from a gel comprising $Al_2O_3$, $P_2O_5$, $SiO_2$, $(Cp_2^*Co)_2O$ and $H_2O$ in a molar ratio of 1:0.9:0.4:0.32:50 where $(Cp^*_2Co)_2$ is bis (pentamethylcyclopentadienyl) cobalt (III) ion and wherein said molecular sieve has an x-ray diffraction pattern as synthesized including lines shown in Table 3.

6. The metal microcrystalline silicoaluminophosphate molecular sieve of claim 5 wherein the molar ratio of $Al_2O_3:P_2O_5:SiO_2:(Cp^*_2Co)_2O:H_2O$ is 1:0.9:0.4:0.32:50 which is identified as UTD-5.

7. A microcrystalline silicoaluminophosphate molecular sieve prepared from a gel comprising $Al_2O_3$, $P_2O_5$, $SiO_2$, $(TPA)_2O$, $(Cp_2Co)O_2$ and $H_2O$ in a molar ration of about 1:0.9:0.4:0.86:0.025:48 where $Cp_2CO$ is bis (cyclopentadienyl)cobalt(III) ion and TPA is tetrapropylammonium ion and wherein said molecular sieve as synthesized exhibits an x-ray diffraction pattern including lines shown in Table 5.

8. A microcrystalline silicoaluminum phosphate molecular sieve that is prepared from a gel having a molar ratio of $Al_2O_3:P_2O_5:CoO:(Cp_2Co)_2O:H_2O$ equal to about 0.8:1:0.4:0.75:53 wherein $(Cp_2Co)_2$ is bis(cyclopentadienyl) cobalt(III) ion that is included within the molecular sieve.

9. A metal microcrystalline silica molecular sieve that has an x-ray powder diffraction pattern as synthesized including lines shown in Table 3.

10. A metal microcrystalline silica molecular sieve that has an x-ray diffraction pattern after calcination that includes the lines set forth in Table 4.

* * * * *